(12) United States Patent
Schneider et al.

(10) Patent No.: US 12,135,003 B2
(45) Date of Patent: Nov. 5, 2024

(54) BEHAVIORAL GUIDANCE SYSTEM FOR FISH

(71) Applicant: Natel Energy Holdings, Inc., Alameda, CA (US)

(72) Inventors: Abraham D. Schneider, San Francisco, CA (US); Sterling Marina Watson, San Francisco, CA (US)

(73) Assignee: Natel Energy Holdings, Inc., Alameda, CA (US)

( * ) Notice: Subject to any disclaimer, the term of this patent is extended or adjusted under 35 U.S.C. 154(b) by 0 days.

(21) Appl. No.: 17/924,506

(22) PCT Filed: May 13, 2021

(86) PCT No.: PCT/US2021/032288
§ 371 (c)(1),
(2) Date: Nov. 10, 2022

(87) PCT Pub. No.: WO2021/231755
PCT Pub. Date: Nov. 18, 2021

(65) Prior Publication Data
US 2023/0175468 A1 Jun. 8, 2023

Related U.S. Application Data

(60) Provisional application No. 63/024,498, filed on May 13, 2020.

(51) Int. Cl.
*F03B 11/00* (2006.01)
(52) U.S. Cl.
CPC ................... *F03B 11/00* (2013.01)

(58) Field of Classification Search
CPC ........................................... F04D 29/70
See application file for complete search history.

(56) References Cited

U.S. PATENT DOCUMENTS 4,025,220 A * 5/1977 Thompson ............ F03B 17/061
415/908
4,594,965 A 6/1986 Asher, Jr. et al.
(Continued)

FOREIGN PATENT DOCUMENTS

CN 109653932 A 4/2019
DE 20 2009 008 836 U1 9/2009
(Continued)

OTHER PUBLICATIONS

English translation of IT1032776 (Year: 1979).*
(Continued)

*Primary Examiner* — Brian O Peters
(74) *Attorney, Agent, or Firm* — Sterne, Kessler, Goldstein & Fox P.L.L.C.

(57) ABSTRACT

Disclosed herein is a device for directing fish toward a preferred path in a water passageway. The device includes a base and a plurality of spaced bars coupled to the base and cantilevered from the base. The plurality of spaced bars are electrified in anode cathode pairs. The plurality of spaced bars can extend from the base to form a frustoconical shape such that the spaced bars direct fish toward a hydraulic turbine blade hub and away from a hydraulic turbine blade tip. Alternatively, the plurality of spaced bars can extend from the base to form a linear array.

18 Claims, 7 Drawing Sheets

(56) References Cited

U.S. PATENT DOCUMENTS

| | | | |
|---|---|---|---|
| 10,294,913 B2* | 5/2019 | Schurtenberger | ......... F03B 3/18 |
| 2010/0007148 A1 | 1/2010 | Davis et al. | |
| 2019/0264647 A1 | 8/2019 | Schurtenberger | |
| 2020/0408184 A1 | 12/2020 | Schneider et al. | |

FOREIGN PATENT DOCUMENTS

| | | | |
|---|---|---|---|
| IT | 1032776 | * | 8/1979 |
| WO | 2017144840 A1 | | 8/2017 |

OTHER PUBLICATIONS

International Search Report and Written Opinion of the International Searching Authority for International Application No. PCT/US2021/032288 mailed on Aug. 20, 2021, 8 pages.

* cited by examiner

BEHAVIORAL GUIDANCE SYSTEM FOR FISH

CROSS-REFERENCE TO RELATED APPLICATION

This application claims the benefit of U.S. Provisional Patent Application No. 63/024,498, filed May 13, 2020, which is incorporated herein by reference in its entirety.

FIELD OF THE INVENTION

The present invention relates to a device for directing the path chosen by fish, such as during passage through a hydraulic turbine, or in other water passageways or intakes.

BACKGROUND OF THE INVENTION

It is desirable for modern freshwater infrastructure to have a minimal effect on fish and other aquatic wildlife (e.g., by not harming fish). For example, modern hydropower facilities often can only be implemented if the hydropower scheme can pass rigorous criteria for environmental sustainability.

BRIEF SUMMARY OF THE INVENTION

Some embodiments described herein are directed to a device for directing fish toward a preferred path in a water passageway. The device includes a base and a plurality of spaced bars coupled to and cantilevered from the base. The plurality of spaced bars are electrified in anode cathode pairs. The plurality of spaced bars can extend from the base to form a frustoconical shape such that the spaced bars direct fish toward a hydraulic turbine blade hub and away from a hydraulic turbine blade tip. Alternatively, the plurality of spaced bars can extend from the base to form a linear array.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Figure 1:
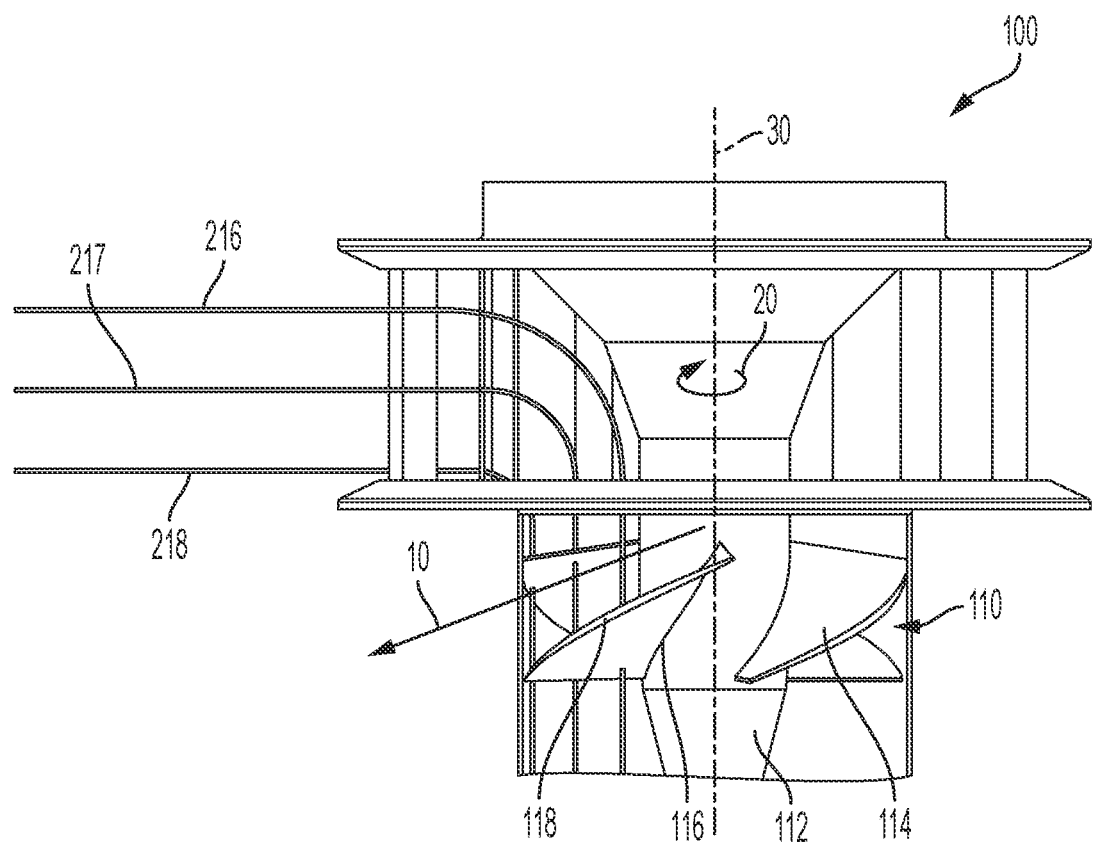
FIG. 1 shows a radial inflow turbine and various trajectories therethrough.

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following examples are illustrative, but not limiting, of the present disclosure. Other suitable modifications and adaptations of the variety of conditions and parameters normally encountered in the field, and which would be apparent to those skilled in the art, are within the spirit and scope of the disclosure.

It is desirable for modern freshwater infrastructure to have a minimal effect on fish and other aquatic wildlife (e.g., by not harming fish). For example, modern hydropower facilities often can only be implemented if the hydropower scheme can pass rigorous criteria for environmental sustainability. In a diverse range of situations, it is desirable to direct fish toward a particular path in a water passage.

Mechanical injury is a primary cause of mortality for fish entrained at hydropower facilities. Mechanical injuries primarily consist of high-velocity collisions with thin blade leading edges, as well as grinding between stationary and moving components such as the blade tip and runner housing of a conventional Kaplan turbine.

Some embodiments of the present disclosure provide a guidance device for directing fish toward a preferred path in a water passageway. Some embodiments direct fish toward a relatively safe path through a hydraulic turbine (e.g., by directing fish toward a hub region of the turbine blade, thereby protecting fish from the high velocities and potential grinding risk present in the tip region of a turbine blade). Some embodiments direct fish toward a safe downstream passage system. Some embodiments direct fish away from an entrance to a particular opening, such as the outlet of a turbine.

The guidance device can be compatible with a wide variety of hydropower facilities; it can be used with new turbines or can be retrofit to existing turbines, and it is scalable to a wide range of turbine sizes.

In some embodiments, the guidance device comprises a base and a plurality of bars coupled to the base. The bars can be arranged in a circle at the base and can be slanted inward toward a central axis such that the bars form a frustoconical shape. The bars can be arranged such that adjacent bars are generally parallel. The bars can be slanted inward toward a central axis such that fish coming into contact with the bars are transported along the bars and into the hub region. This configuration can also enable self-cleaning behavior from debris and sediment. In an aspect, the bars can be cantilevered from the base. In an aspect, the bars are electrified.

In some embodiments, the guidance device comprises a base and a plurality of bars coupled to and cantilevered from the base. The base can extend in a vertical direction, and the bars can extend horizontally from the base such that the bars form a horizontal array. In an aspect, the bars are electrified.

In some embodiments, the bars are electrified in anode cathode pairs.

The bars can be electrified, for example, such that the orientation of the electric field due to the electrification substantially aligns with a lateral line of a fish as it passes the guidance device. Fish passing near the bars may sense the electric field and react to it, for example to move away from the bars and electric field. As a result, the electrification may further guide fish toward a preferred path (e.g., a relatively safe path through a hydraulic turbine). Electrification of the bars can also permit increased gap spacing between adjacent bars, as compared to a non-electrified guidance device. In an aspect, the gap spacing between adjacent bars of an electrified fish device can be approximately one to approximately four times that of a non-electrified guidance device. In an aspect, the gap spacing between adjacent bars of an electrified fish device can be approximately three times that of a non-electrified guidance device.

These and other embodiments are discussed below in more detail with reference to the figures.

FIG. 1 shows a hydraulic turbine 100. The illustrated turbine is a radial inflow turbine. In some embodiments, however, turbine 100 can be an axial inflow turbine. Hydraulic turbine 100 can include runner 110. Runner 110 can include a hub 112 and a plurality of blades 114 extending radially from hub 112. Each blade 114 of runner 110 can include a root 116 located at hub 112, a tip 118 opposite root 116 and defining an outermost extent of blade 114 in radial direction 10. Runner 110 may be configured to rotate in a circumferential direction 20 about longitudinal axis 30. In the embodiment shown in FIG. 1, for example, circumferential direction 20 is counterclockwise when viewed from an upstream side of runner 110. However, in other embodiments, circumferential direction 20 may be clockwise when viewed from an upstream side of runner 100.

Fish can follow a variety of trajectories through turbine 100. Trajectories 216, 217, and 218 are exemplary trajectories that a fish may follow through turbine 100. Trajectory 218 passes near tip 118. As will be discussed in greater detail, a fish passing through turbine 100 along trajectory 218 is exposed to the highest blade velocities and potential grinding risks. Trajectory 217 passes near the middle of blade 114. As will be discussed in greater detail, a fish passing through turbine 100 along trajectory 218 is exposed to moderate blade velocities. Trajectory 216 passes near hub 116. As will be discussed in greater detail, a fish passing through turbine 100 along trajectory 216 is exposed to relatively low blade velocities.

Figure 2:
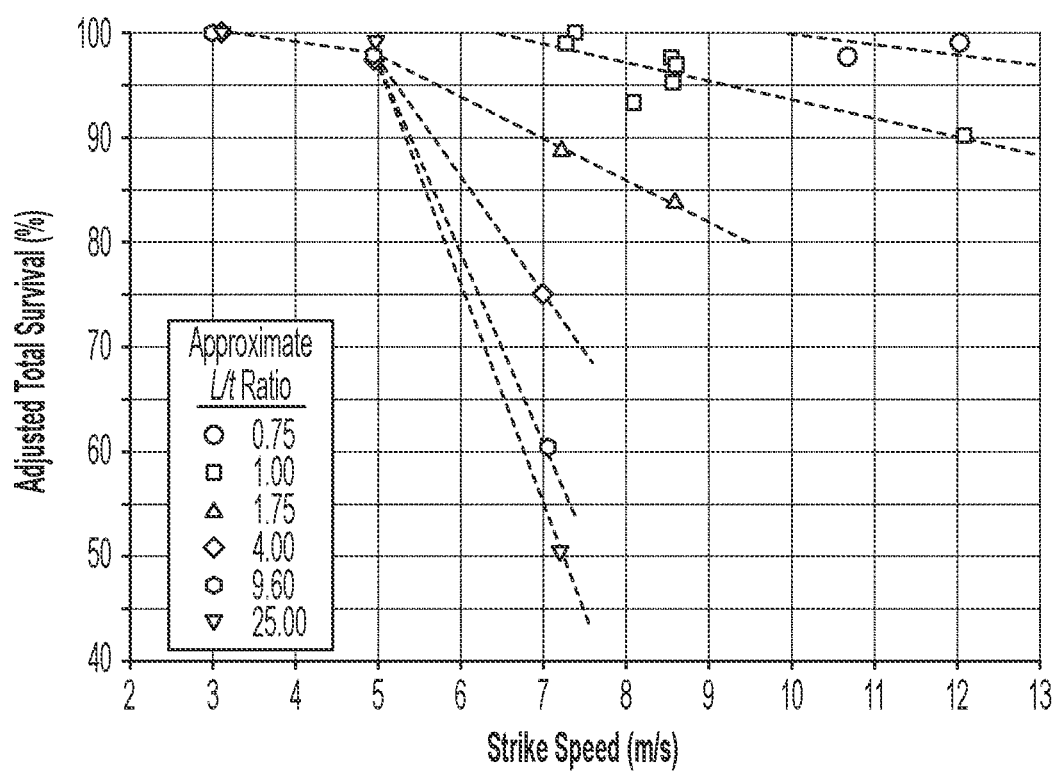
FIG. 2 shows adjusted total blade strike survival rates by strike speed and L/t ratio for tests conducted with rainbow trout.

FIG. 2 shows adjusted total blade strike survival rates by strike speed and L/t ratio for tests conducted with rainbow trout, a representative salmonid species. Strike velocity is an important factor in fish injury at hydropower facilities. As shown in FIG. 2, for a particular L/t ratio, fish blade strike survival rates are generally higher at lower strike speeds. This general relationship between survival and strike speeds holds for a variety of species, including trout, eel, bluegill, and sturgeon.

A strike speed of approximately 5 m/s can be considered a "safe" strike speed in which no or minimal mortality is observed for rainbow trout, even for relatively sharp blade leading edges with a large fish length to blade thickness ratio (L/t) (e.g., L/t=25, which is standard in compact conventional hydro turbine designs). As L/t ratio decreases (i.e., fish body length becomes smaller relative to the blade thickness), the sensitivity of strike to velocity at velocities above the 5 m/s threshold is less severe.

Blade velocity increases linearly with radial distance from the hub. As a result, fish injury and mortality rates are higher for fish that pass through the turbine in the tip region (e.g., along trajectory 218 of FIG. 1) than for fish that pass through the same turbine in the hub region (e.g., along trajectory 216 of FIG. 1). For example, even if strike velocity is below the 5 m/s threshold in the hub region, strike velocities may easily exceed 12 m/s or more near the tip.

Figure 3:
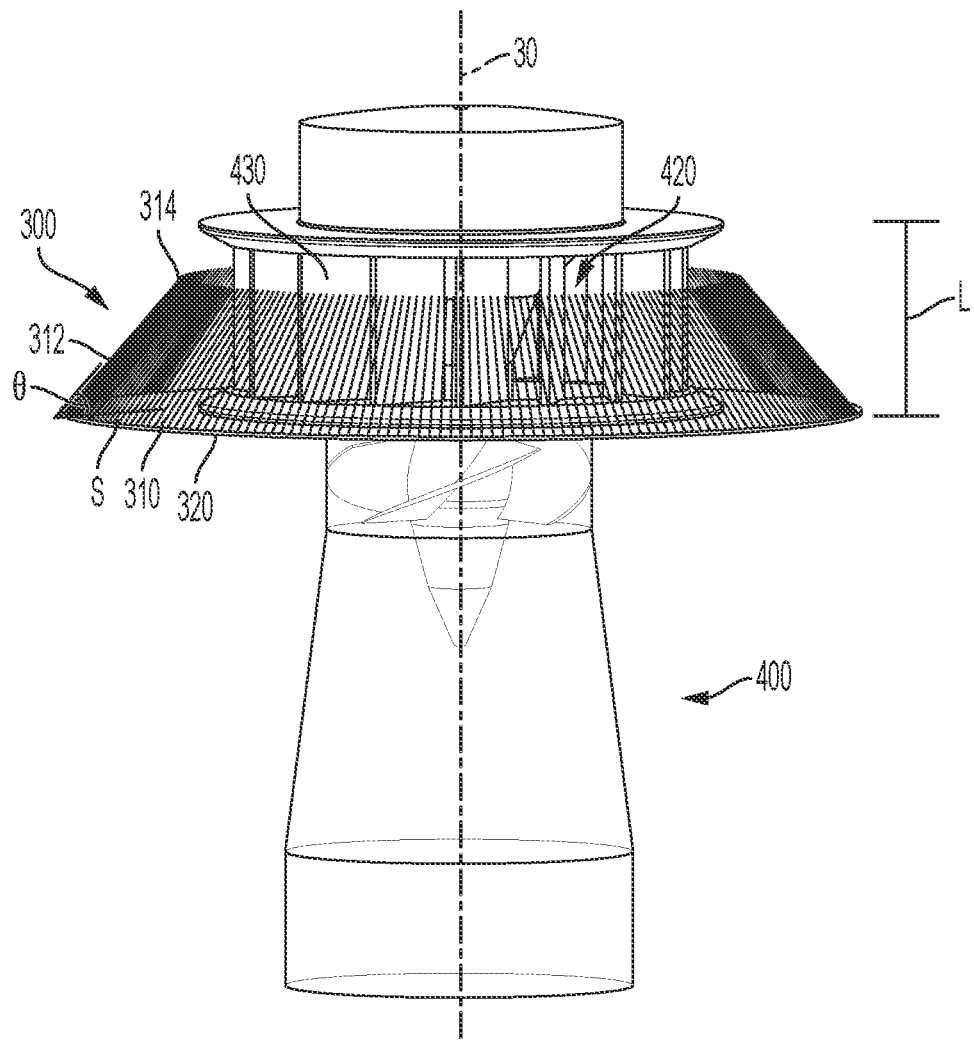
FIG. 3 shows a radial-inflow turbine equipped with a guidance device.

FIG. 3 shows a radial-inflow turbine 400 equipped with a guidance device 300. Guidance device 300 can be arranged around an inlet 420 of turbine 400. In some embodiments, guidance device 300 can be mounted outside wicket gates 430 of turbine 400. In new turbines, guidance device 300 can be integrated into turbine 400 in any desirable manner to direct fish toward the hub region. In retrofits, guidance device 300 can be mounted to an existing structure of turbine 400 (e.g., a scrollcase floor) to direct fish toward the hub region.

Guidance device 300 can include a plurality of bars 310 coupled to a base 320. Bars 310 can generally extend along a flow direction. In an aspect, bars 310 can be cantilevered from base 320. To the extent bars 310 include additional structural support, the support can be positioned on an interior side of guidance device 300 to prevent entanglement with debris.

In some embodiments, adjacent bars 310 can be generally parallel to each other. The spacing (S) between bars 310 can vary depending on the size of fish intended to be guided by guidance device 300. An appropriate gap spacing can be used to guide a range of species and life stages, including juvenile and adult salmonids, anguillidae, alosines, and cyprinids. For example, adjacent bars 310 can have a gap spacing of approximately 20 mm. In some embodiments, bars 310 can have a gap spacing of approximately 50 mm apart. In another aspect, adjacent bars 310 can have a gap spacing of approximately 10 mm to approximately 60 mm, such as approximately 20 mm to approximately 50 mm. In another aspect, adjacent bars 310 can have a gap spacing of 1000 mm or greater.

In some embodiments, for example, as shown in FIG. 3, bars 310 are inclined toward a central axis 30 such that bars 310 form a frustoconical shape. This configuration can, for example, direct fish that come into contact with bars 310 along outer surfaces 312 of bars 310 and off tips 314 of bars 310 into hub region of turbine 400. Water flowing into turbine 400 contributes to this effect. Such a configuration can also guide debris and sediment in a similar manner, thereby enabling self-cleaning of guidance device 300. In some embodiments, for example, as shown in FIG. 3, bars 310 can be inclined at an angle θ of approximately 45 degrees relative to a transverse direction. In an aspect, bars 310 can be inclined at other angles θ. For example, bars 310 can be inclined at an angle of approximately 5 degrees to approximately 50 degrees, such as approximately 10 degrees to approximately 45 degrees, such as approximately 15 degrees to approximately 35 degrees. In an aspect, bars can be inclined at an angle of approximately 10 degrees, approximately 30 degrees, or approximately 40 degrees.

Bars 310 can leave a gap at the top of the intake region that can be approximately 0.05 times to approximately 0.2 times the length of the intake region (L) of the turbine. Therefore, the length of bars 310 can vary depending on the size of turbine 400. In some embodiments, bars 310 leave a gap at the top of the intake region that is approximately 0.05 times to approximately 0.2 times L.

Bars 310 can have a streamlined cross section in order to minimize disturbance to water flow through turbine 400. For example, in some embodiments, bars 310 have a circular cross section. As another example, bars 310 can have a teardrop-shaped cross section. In general, guidance device 300 and bars 310 can be designed to minimally affect water flow through turbine 400, thereby increasing passage survival rates without reducing turbine performance. In an aspect, bars 310 can be cantilevered and/or shaped to induce vibration of bars 310 to further direct fish. In an aspect, bars 310 can be flexible (i.e., have a low modulus of elasticity).

In some embodiments, for example, as shown in FIG. 3, bars 310 are cantilevered from base 320. Cantilevering can, for example, eliminate transverse connections that could otherwise trap debris or sediment. In some embodiments, bars 310 are not coupled to each other via a transverse connection. In some embodiments, bars 310 are coupled to each other via additional transverse connections. Additional transverse connections can be located at interior surfaces of the bars (i.e., surfaces located toward central axis 30).

In some embodiments, bars 310 are movably coupled to base 320 (e.g., through use of a spring). Movable coupling can, for example, reduce fatigue due to flow-induced vibrations. When movable coupling is combined with cantilevering, bars 310 can pivot to and from an initial position to allow passage of large debris through guidance device 300.

In some embodiments, bars 310 are flexible. When bars 310 are flexible, bars 310 can flex to and from an initial position to allow passage of large debris through guidance device 300.

In some embodiments, bars 310 can be electrified. In some embodiments, bars 310 can be electrified in anode cathode pairs. Fish passing near bars 310 may sense an electric field from bars 310 and react to it, for example to move away from the bars 310 and electric field. In embodiments in which bars 310 are electrified, bars 310 can be mounted to an electrified busbar. In turn, the busbar can be connected to a power source. Bars 310 can be electrified such that the orientation of the electric field substantially aligns with a longitudinal axis of the fish as it passes guidance device 300. For example, in the arrangement shown in FIG. 3, fish approaching turbine 400 tend to swim so that they are parallel to bars 310. So bars 310 can be electrified such that the orientation of the electric field substantially aligns with the orientation of bars 310. In embodiments in which bars 310 are electrified, the electrical design can avoid narcotization effects to the fish. For example, bars 310 may have a voltage of approximately 80 V.

Electrifying bars 310 can allow for increased gap spacing between adjacent bars 310, while achieving the same or better guidance of fish, as compared to a non-electrified guidance device. In an aspect, the gap spacing between adjacent bars 310 of an electrified fish device can be approximately one to approximately four times that of a non-electrified guidance device. In an aspect, the gap spacing between adjacent bars 310 of an electrified fish device can be approximately three times that of a non-electrified guidance device. For example, an unelectrified guidance device 300 may have bars 310 that can be spaced approximately 20 mm apart. An electrified guidance device 300 intended to guide the same fish may have bars 310 that can be spaced approximately 60 mm apart, or much wider such as 1000 mm apart.

In embodiments in which bars 310 are not electrified, bars 310 can be made from any suitable material, such as steel. In embodiments in which bars 310 are electrified, bars 310 can be made from a suitable conductive material. Guidance device 300 can include an anti-biofouling coating.

Figure 4:
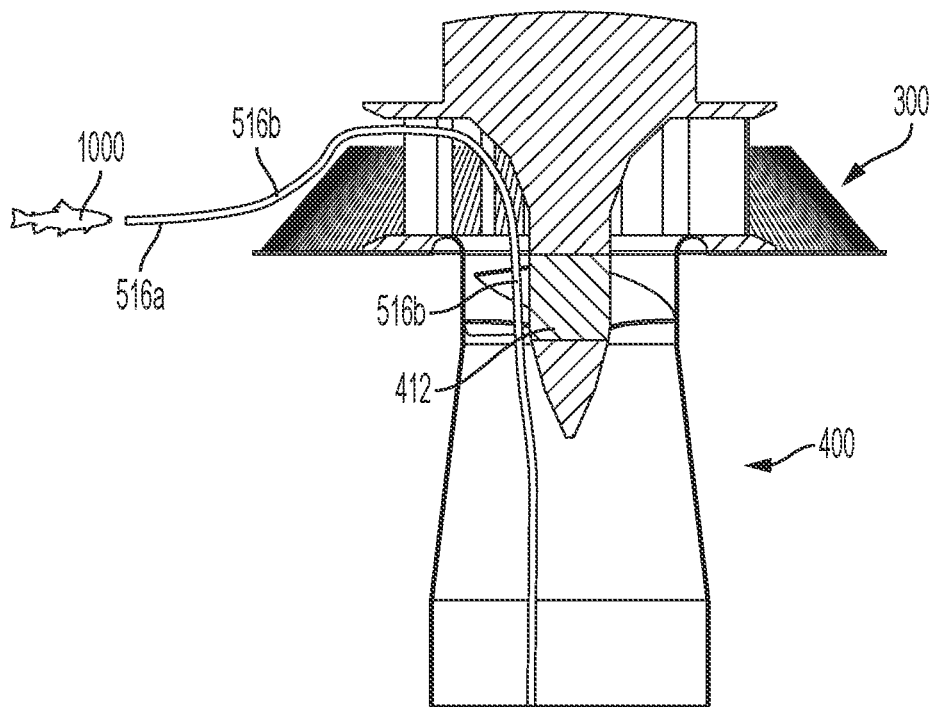
FIG. 4 shows a fish passage path through the radial-inflow turbine equipped with the guidance device of FIG. 3.

As shown, for example, in FIG. 4, guidance device 300 can act as a physical and/or behavior deterrent to direct fish toward a safer pathway through turbine 400. For example, a fish 1000 may approach turbine 400 along trajectory 516a. Guidance device 300 can guide fish 1000 through turbine 400 along a trajectory 516b that passes near hub 412, where blade velocities are lowest and strike survival is most probable.

Figure 5A:
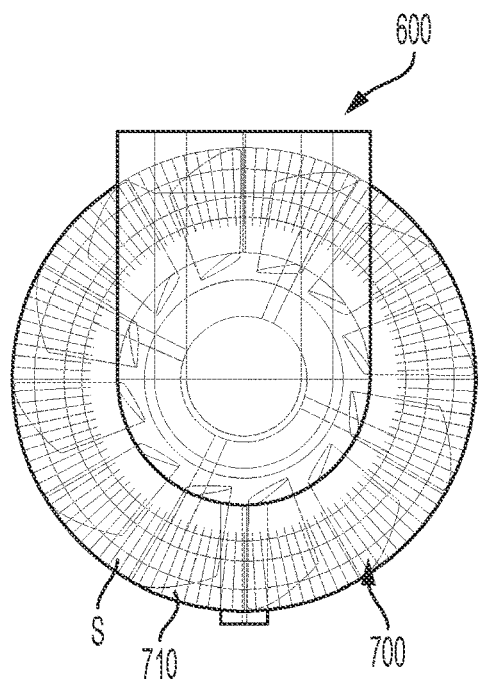
FIGS. 5A-5C show an axial-flow turbine equipped with a guidance device.
Figure 5B:
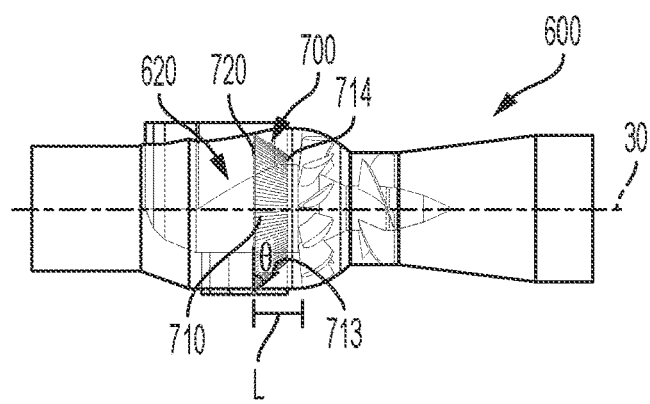
Figure 5C:
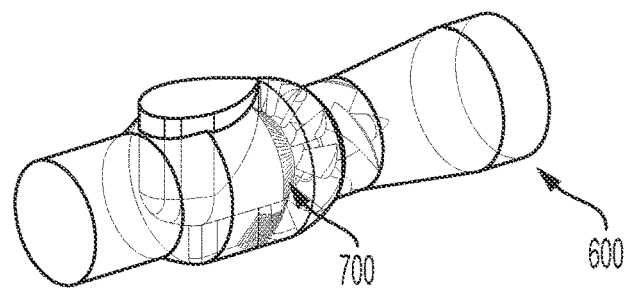

FIGS. 5A-5C show an axial-flow turbine 600 equipped with a guidance device 700. In an aspect, guidance device 700 can include all the features of guidance device 300, discussed above. The illustrated axial-flow turbine 600 is a pit turbine. However, turbine 600 can be a bulb turbine.

Guidance device 700 can be arranged at an inlet 620 of turbine 600. In new turbines, guidance device 700 can be integrated into turbine 600 in any desirable manner to direct fish toward the hub region. In retrofits, guidance device 700 can be mounted to an existing structure of turbine 600 to direct fish toward the hub region.

Guidance device 700 can include a plurality of bars 710 coupled to a base 720. Bars 710 can generally extend along a flow direction. In an aspect, bars 710 can be cantilevered from base 720. To the extent bars 710 include additional structural support, the support can be positioned on an exterior side of guidance device 700 to prevent entanglement with debris.

In some embodiments, adjacent bars 710 can be generally parallel to each other. The spacing (S) between bars 710 can vary depending on the size of fish intended to be guided by guidance device 700. An appropriate gap spacing can be used to guide a range of species and life stages, including juvenile and adult salmonids, anguillidae, alosines, and cyprinids. For example, adjacent bars 710 can have a gap spacing of approximately 20 mm. In some embodiments, bars 710 can have a gap spacing of approximately 50 mm apart. In another aspect, adjacent bars 710 can have a gap spacing of approximately 10 mm to approximately 60 mm, such as approximately 20 mm to approximately 50 mm. In another aspect, adjacent bars 710 can have a gap spacing of 1000 mm or greater.

In some embodiments, for example, as shown in FIGS. 5A-5C, bars 710 can be inclined toward a central axis 30 such that bars 710 form a frustoconical shape. This configuration can, for example, direct fish that come into contact with bars 710 along inner surfaces 713 of bars 710 and off tips 714 of bars 710 into hub region of turbine 600. Water flowing into turbine 600 contributes to this effect. Such a configuration can also guide debris and sediment in a similar manner, thereby enabling self-cleaning of guidance device 700. In some embodiments, for example, as shown in FIGS. 5A-5C, bars 710 can be inclined at an angle θ of approximately 45 degrees relative to a transverse direction. In an aspect, bars 710 can be inclined at other angles θ. For example, bars 710 can be inclined at an angle of approximately 5 degrees to approximately 50 degrees, such as approximately 10 degrees to approximately 45 degrees, such as approximately 15 degrees to approximately 35 degrees. In an aspect, bars can be inclined at an angle of approximately 10 degrees, approximately 30 degrees, or approximately 40 degrees.

Bars 710 can leave a gap at the top of the intake region that can be approximately 0.05 times to approximately 0.2 times the length of the intake region (L) of the turbine. Therefore, the length of bars 710 can vary depending on the size of turbine 600. In some embodiments, bars 710 leave a gap at the top of the intake region that is approximately 0.05 times to approximately 0.2 times L.

Bars 710 can have a streamlined cross section in order to minimize disturbance to water flow through turbine 600. For example, in some embodiments, bars 710 have a circular cross section. As another example, bars 710 can have a teardrop-shaped cross section. In general, guidance device 700 and bars 710 can be designed to minimally affect water flow through turbine 400, thereby increasing passage survival rates without reducing turbine performance. In an aspect, bars 710 can be cantilevered and/or shaped to induce vibration of bars 710 to further direct fish. In an aspect, bars 710 can be flexible (i.e., have a low modulus of elasticity).

In some embodiments, for example, as shown in FIGS. 5A-5C, bars 710 are cantilevered from base 720. Cantilevering can, for example, eliminate transverse connections that could otherwise trap debris or sediment. In some embodiments, bars 710 are not coupled to each other via a transverse connection. In some embodiments, bars 710 are coupled to each other via additional transverse connections. Additional transverse connections can be located at exterior surfaces of the bars (i.e., surfaces located away central axis 30) to minimize interference with debris.

In some embodiments, bars 710 are movable coupled to base 720 (e.g., through use of a spring). Moveable coupling can, for example, reduce fatigue due to flow-induced vibrations. When moveable coupling is combined with cantilevering, bars 710 can pivot to and from an initial position to allow passage of large debris through guidance device 700.

In some embodiments, bars 710 are flexible. When bars 710 are flexible, bars 710 can flex to and from an initial position to allow passage of large debris through guidance device 700.

In some embodiments, bars 710 can be electrified. In some embodiments, bars 710 can be electrified in anode cathode pairs. Fish passing near bars 710 may sense an electric field from bars 710 and react to it, for example to move away from the bars 710 and electric field. In embodiments in which bars 710 are electrified, bars 710 can be coupled to an electrified busbar. In turn, the busbar can be connected to a power source. Bars 710 can be electrified such that the orientation of electric field substantially aligns with a longitudinal axis of the fish as it passes guidance device 700. For example, in the arrangement shown in FIGS. 5A-5C, fish approaching turbine 400 tend to swim so that they are parallel to bars 710. So bars 710 can be electrified such that the orientation of the electric field substantially aligns with the orientation of bars 710. In embodiments in which bars 710 are electrified, the electrical design can avoid narcotization effects to the fish. For example, bars 710 may have a voltage of approximately 80 V.

Electrifying bars 710 can allow for increased gap spacing between adjacent bars 710, while achieving the same or better guidance of fish, as compared to a non-electrified guidance device. In an aspect, the gap spacing between adjacent bars 710 of an electrified fish device can be approximately one to approximately four times that of a non-electrified guidance device. In an aspect, the gap spacing between adjacent bars 710 of an electrified fish device can be approximately three times that of a non-electrified guidance device. For example, an unelectrified guidance device 700 may have bars 710 that can be spaced approximately 20 mm apart. An electrified guidance device 700 intended to guide the same fish may have bars 710 that can be spaced approximately 60 mm apart, or much wider such as 1000 mm apart.

In embodiments in which bars 710 are not electrified, bars 710 can be made from any suitable material, such as steel. In embodiments in which bars 710 are electrified, bars 710 can be made from a suitable conductive material. Guidance device 700 can include an anti-biofouling coating.

Figure 6:
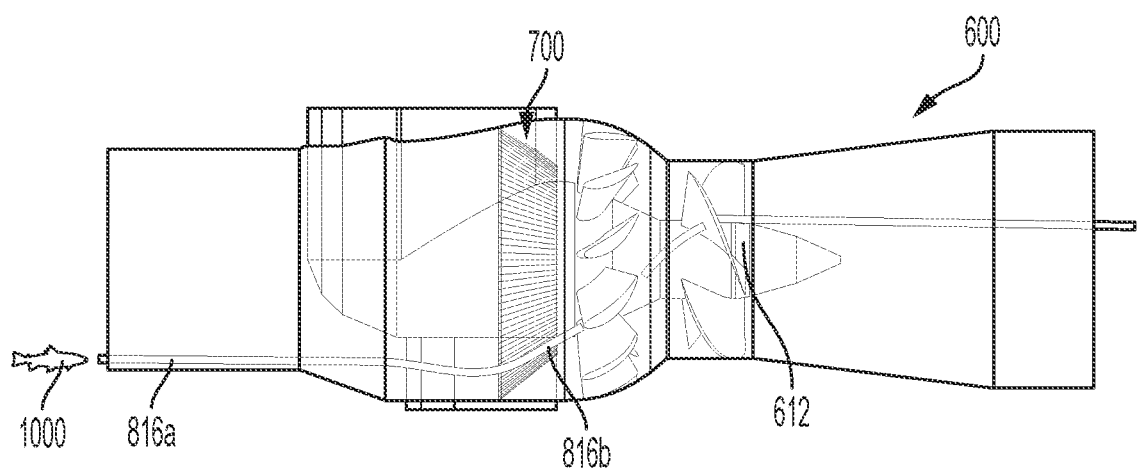
FIG. 6 shows a fish passage path through the axial-flow turbine equipped with the guidance device of FIGS. 5A-5C.

As shown, for example, in FIG. 6, guidance device 700 can act as a physical and/or behavior deterrent to direct fish toward a safer pathway through turbine 600. For example, a fish 1000 may approach turbine 600 along trajectory 816a. Guidance device 700 can guide fish 1000 through turbine 600 along a trajectory 816b that passes near hub 612, where blade velocities are lowest and strike survival is most probable.

Figure 7:
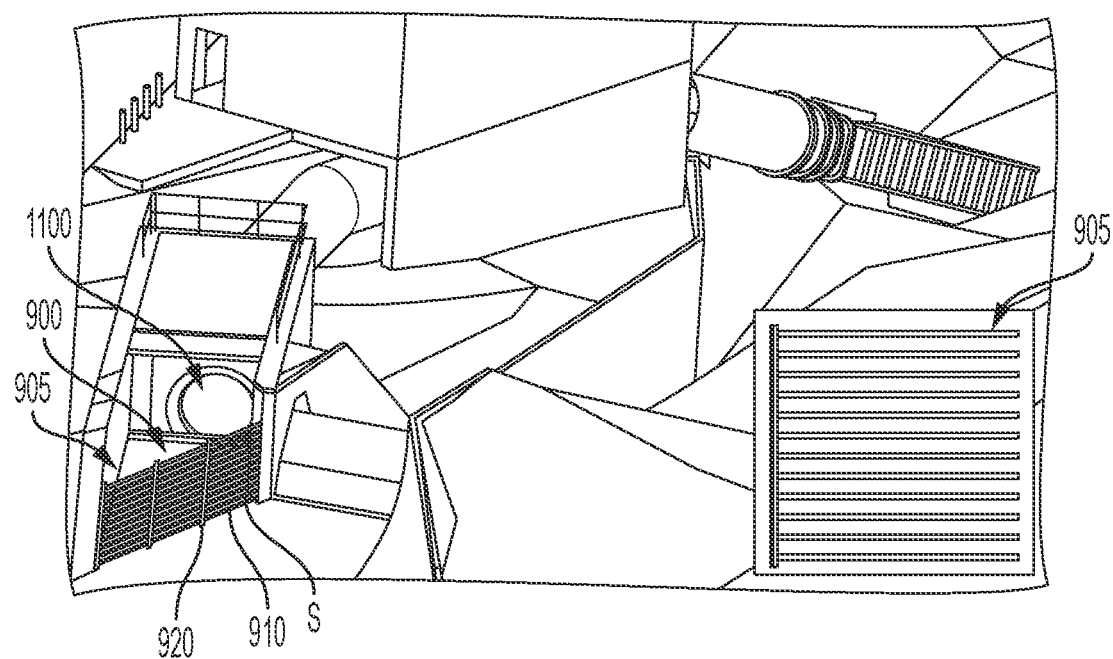
FIG. 7 shows a linearized modular bypass guidance device.

FIG. 7 shows a linearized modular bypass guidance device 900. Guidance device 900 can act as a physical and/or behavior deterrent to direct fish toward a particular path. For example, guidance device 900 can direct fish away from intake 1100. In other embodiments, guidance device 900 can direct fish toward a safe downstream passage system.

Guidance device 900 can include one or a plurality of modules 905. In turn, each module can include a plurality of bars 910 coupled to a base 920. Bars 910 can generally extend along a flow direction. In an aspect, bars 910 can be cantilevered from base 920. To the extent bars 910 include additional structural support, the support can be positioned on an interior side of guidance device 900 to prevent entanglement with debris.

In some embodiments, adjacent bars 910 can be generally parallel to each other and extend horizontally. The spacing (S) between bars 910 can vary depending on the size of fish intended to be guided by guidance device 900. An appropriate gap spacing can be used to guide a range of species and life stages, including juvenile and adult salmonids, anguillidae, alosines, and cyprinids. For example, adjacent bars 910 can have a gap spacing of approximately 20 mm. In some embodiments, bars 910 can have a gap spacing of approximately 50 mm. In another aspect, adjacent bars 910 can have a gap spacing of approximately 10 mm to approximately 60 mm, such as approximately 20 mm to approximately 50 mm. In another aspect, adjacent bars 910 can have a gap spacing of 1000 mm or greater.

Bars 910 can have a streamlined cross section in order to minimize disturbance to water flow through guidance device 900 and to intake 1100. For example, in some embodiments, bars 910 have a circular cross section. As another example, bars 910 can have a teardrop-shaped cross section. In general, guidance device 900 and bars 910 can be designed to minimally affect water flow through turbine 600, thereby increasing passage survival rates. In an aspect, bars 910 can be cantilevered and/or shaped to induce vibration of bars 910 to further direct fish. In an aspect, bars 910 can be flexible (i.e., have a low modulus of elasticity).

In some embodiments, for example, as shown in FIG. 7, bars 910 are cantilevered from base 920. Cantilevering can, for example, eliminate transverse connections that could otherwise trap debris or sediment. In some embodiments, bars 910 are not coupled to each other via a transverse connection. In some embodiments, bars 910 are coupled to each other via additional transverse connections. Additional transverse connections can be located at interior surfaces of the bars (i.e., surfaces located toward intake 1100).

In some embodiments, bars 910 are movably coupled to base 920 (e.g., through use of a spring). Movable coupling can, for example, reduce fatigue due to flow-induced vibrations. When movable coupling is combined with cantilevering, bars 910 can pivot to and from an initial position to allow passage of large debris through guidance device 900.

In some embodiments, bars 910 are flexible. When bars 910 are flexible, bars 910 can flex to and from an initial position to allow passage of large debris through guidance device 900.

In some embodiments, bars 910 can be electrified. In some embodiments, bars 910 can be electrified in anode cathode pairs. Fish passing near bars 910 may sense an electric field from bars 910 and react to it, for example to move away from the bars 910 and electric field. In embodiments in which bars 910 are electrified, bars 910 can be coupled to an electrified busbar. In turn, the busbar can be connected to a power source. Bars 910 can be electrified such that the orientation of electric field substantially aligns with a longitudinal axis of the fish as it passes guidance device 900. In embodiments in which bars 910 are electrified, the electrical design can avoid narcotization effects to the fish. For example, bars 910 may have a voltage of approximately 80 V.

Electrifying bars 910 can allow for increased gap spacing between adjacent bars 910, while achieving the same or better guidance of fish, as compared to a non-electrified guidance device. In an aspect, the gap spacing between adjacent bars 910 of an electrified guidance can be approximately one to approximately four times that of a non-electrified guidance device. In an aspect, the gap spacing between adjacent bars 910 of an electrified guidance device can be approximately three times that of a non-electrified guidance device. For example, an unelectrified guidance device 900 may have bars 910 that can be spaced approximately 20 mm apart. An electrified guidance device 900 intended to guide the same fish may have bars 910 that can be spaced approximately 60 mm apart, or much wider such as 1000 mm apart.

In embodiments in which bars 910 are not electrified, bars 910 can be made from any suitable material, such as steel. In embodiments in which bars 910 are electrified, bars 910 can be made from a suitable conductive material. Guidance device 900 can include an anti-biofouling coating.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A guidance device for directing fish toward a relatively safe path through a hydraulic turbine, the guidance device comprising:
a base; and
a plurality of spaced bars coupled to the base,
wherein the plurality of spaced bars extend from the base to form a frustoconical shape such that the plurality of spaced bars direct fish toward a hydraulic turbine blade hub and away from a hydraulic turbine blade tip, and
wherein at least one of the plurality of spaced bars is electrified.

2. The guidance device according claim 1, wherein adjacent bars of the plurality of spaced bars are generally parallel.

3. The guidance device according to claim 1, wherein the plurality of spaced bars are cantilevered from the base.

4. The guidance device according to claim 1, wherein the plurality of spaced bars are arranged at an angle of approximately 45 degrees.

5. The guidance device according to claim 1, wherein the plurality of spaced bars are arranged at an angle of approximately 10 degrees to approximately 45 degrees.

6. The guidance device according to claim 1, wherein adjacent bars of the plurality of spaced bars have a gap spacing of approximately 10 mm to approximately 60 mm.

7. The guidance device according to claim 1, wherein adjacent bars of the plurality of spaced bars have a gap spacing of greater than 1000 mm.

8. The guidance device according to claim 1, wherein at least two of the plurality of spaced bars are electrified and arranged in an anode cathode pair.

9. The guidance device according to claim 1, wherein the electrified bar generates an electric field that directs fish toward the blade hub and away from the blade tip.

10. The guidance device according to claim 1, wherein the plurality of spaced bars are flexible.

11. The guidance device according to claim 1, wherein the plurality of spaced bars are moveably coupled to the base.

12. The guidance device according to claim 11, wherein the base extends in a vertical direction and the plurality of spaced bars extends horizontally from the base.

13. The guidance device according to claim 11, wherein adjacent bars of the plurality of spaced bars are generally parallel.

14. The guidance device according to claim 11, wherein the plurality of spaced bars are flexible.

15. The guidance device according to claim 11, wherein adjacent bars of the plurality of spaced bars have a gap spacing of approximately 10 mm to approximately 60 mm.

16. The guidance device according to claim 11, wherein adjacent bars of the plurality of spaced bars have a gap spacing of greater than 1000 mm.

17. The guidance device according to claim 11, wherein at least two of the plurality of spaced bars are electrified and arranged in an anode cathode pair.

18. An assembly, comprising:
a hydraulic turbine; and
a guidance device mounted to the turbine, the guidance device comprising:
a base; and
a plurality of spaced bars coupled to the base,
wherein the plurality of spaced bars extends from the base to form a frustoconical shape such that the plurality of spaced bars direct fish toward a hydraulic turbine blade hub and away from a hydraulic turbine blade tip, and
wherein at least one of the plurality of spaced bars is electrified.

* * * * *